United States Patent
Ishikawa et al.

(10) Patent No.: US 7,798,071 B2
(45) Date of Patent: Sep. 21, 2010

(54) ROTARY TABLE SYSTEM

(75) Inventors: Hirokazu Ishikawa, Shinagawa-ku (JP);
Shunji Matsutomi, Shinagawa-ku (JP);
Tsutomu Hasegawa, Shinagawa-ku (JP); Mitsuteru Nanba, Shinagawa-ku (JP)

(73) Assignees: THK Co., Ltd., Tokyo (JP); THK Intechs Co., Ltd., Tokyo (JP)

( * ) Notice: Subject to any disclaimer, the term of this patent is extended or adjusted under 35 U.S.C. 154(b) by 937 days.

(21) Appl. No.: 10/586,482

(22) PCT Filed: Jan. 20, 2005

(86) PCT No.: PCT/JP2005/000702

§ 371 (c)(1),
(2), (4) Date: Jul. 20, 2006

(87) PCT Pub. No.: WO2005/071690

PCT Pub. Date: Aug. 4, 2005

(65) Prior Publication Data

US 2007/0116392 A1 May 24, 2007

(30) Foreign Application Priority Data

Jan. 23, 2004 (JP) .............................. 2004-015165

(51) Int. Cl.
*A47B 85/00* (2006.01)

(52) U.S. Cl. ............................ 108/20; 74/16; 248/349.1

(58) Field of Classification Search .................... 108/22, 108/20, 21, 143, 94; 74/16, 825, 813 R; 248/349.1
See application file for complete search history.

(56) References Cited

U.S. PATENT DOCUMENTS 4,555,990 A * 12/1985 Egawa .......................... 108/20

(Continued)

FOREIGN PATENT DOCUMENTS

JP 729325 U 6/1995

(Continued)

OTHER PUBLICATIONS

International Search Report mailed May 10, 2005 of International Application PCT/JP2005/000702.

(Continued)

*Primary Examiner*—José V Chen
(74) *Attorney, Agent, or Firm*—Westerman, Hattori, Daniels & Adrian, LLP

ABSTRACT

A rotary table system having high axial and radial run-out accuracy, high resolution, and thin and medium- or large-sized system. The rotary table system includes a guide apparatus and a rotary table mounted on the guide apparatus. The guide apparatus includes a ring-shaped integrated rail having no discontinuity in the travel direction thereof, and a plurality of guide blocks assembled to the rail from the direction of their surfaces opposing the rail. The surface of the rail opposite to the surface thereof opposing the guide blocks and the underside of the rotary table are joined together. The rail has an L-shaped cross-sectional configuration formed from a vertical portion and a horizontal portion extending from the upper end of the vertical portion in the radial direction of the rotary table. A tape scale that is detected by a detecting mechanism is provided on the outer peripheral surface of the rail.

11 Claims, 7 Drawing Sheets

U.S. PATENT DOCUMENTS

| | | | |
|---|---|---|---|
| 4,694,132 A * | 9/1987 | Liu | 108/20 |
| 4,886,948 A * | 12/1989 | Pomroy et al. | 108/20 |
| 5,163,651 A * | 11/1992 | Matsumoto | 108/20 |
| 5,411,334 A | 5/1995 | Takei et al. | |
| 5,533,844 A * | 7/1996 | Ekleberry | 108/20 |
| 5,575,565 A * | 11/1996 | Takei et al. | 384/45 |
| 5,784,932 A * | 7/1998 | Gilberti | 74/813 R |
| 5,809,834 A * | 9/1998 | Goldy | 74/89.22 |
| 6,049,988 A * | 4/2000 | Shirai | 33/1 M |
| 6,196,138 B1 * | 3/2001 | Sakai et al. | 108/22 |
| 6,868,794 B2 * | 3/2005 | Bullock et al. | 108/94 |
| 6,997,512 B1 * | 2/2006 | Yu | 108/94 |
| 2001/0017951 A1 | 8/2001 | Kamimura et al. | |

FOREIGN PATENT DOCUMENTS

| | | |
|---|---|---|
| JP | 8-21440 A | 1/1996 |
| JP | 8-21441 A | 1/1996 |
| JP | 9-79253 A | 3/1997 |
| JP | 9-125736 A | 5/1997 |

OTHER PUBLICATIONS

Japanese Office Action dated Apr. 20, 2010, issued in corresponding Japanese Patent Application No. 2004-15165.

Supplementary European Search Report dated Jul. 1, 2010, issued in corresponding European Patent Application No. 05703930.7.

* cited by examiner

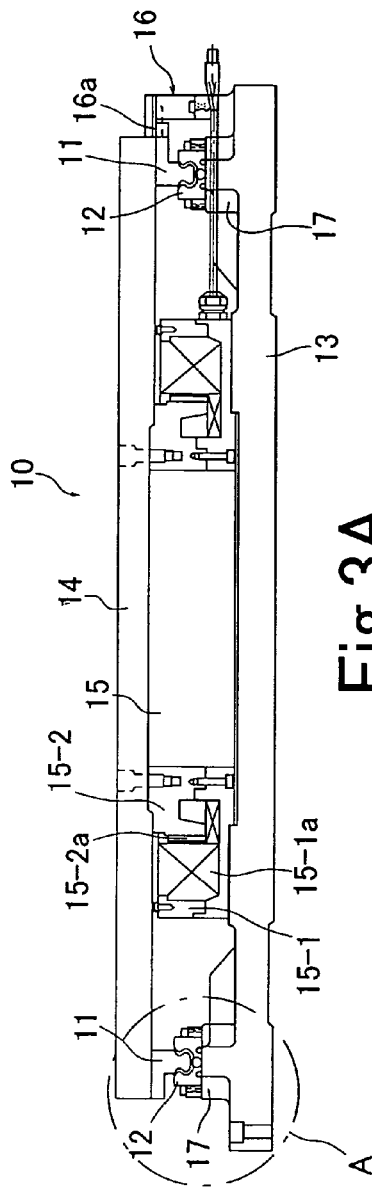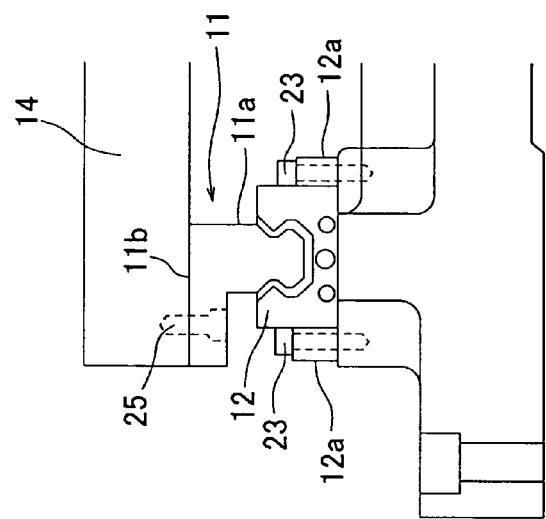
Fig.3A
Fig.3B

ROTARY TABLE SYSTEM

TECHNICAL FIELD

The present invention relates to a high-precision rotary table system suitable for mounting thereon an inspection system that performs high-precision inspection, e.g. an X-ray inspection system.

BACKGROUND ART

Examples of conventional rotary table systems of the type described above are disclosed in Patent Documents 1 and 2. The rotary table system disclosed in Patent Document 1 has a base, a rotary table rotated about a predetermined center of rotation set on the base, and a rotation driving mechanism having a rotation guide installed between the base and the rotary table and a rotation driving source that drives the rotary table to rotate through the rotation guide. The rotation guide includes a ring-shaped endless track formed from a plurality of track members, and a plurality of guide units sliding along the track. The rotary table is mounted on the plurality of guide units.

The rotary table system disclosed in Patent Document 2 includes a curvilinear guide apparatus having a plurality of slides movably attached to a ring-shaped integrated endless track rail with a multiplicity of rolling elements interposed therebetween so that the slides slide along the endless track rail. A table is secured to the plurality of slides of the curvilinear guide apparatus. Thus, the table is rotatably supported by a fixed bed through the curvilinear guide apparatus.
Patent Document 1:
  Japanese Patent Application Publication No. Hei 9-125736
Patent Document 2:
  Japanese Patent Application Publication No. Hei 8-21440

DISCLOSURE OF THE INVENTION

Problem to be Solved by the Invention:

In the rotary table system disclosed in the above-described Patent Document 1, a plurality of guide blocks (slides) on which a rotary table is mounted slide along a ring-shaped (annular) endless track rail, and the endless track rail is formed from a plurality of track members. Therefore, there are joints between the track members, and minute steps occur unavoidably. In addition, because the endless track rail is formed from a plurality of track members, a high degree of coaxiality cannot be obtained for the endless track rail. For this reason, axial and radial run-outs are unfavorably large. Accordingly, a high-precision rotary table system cannot be obtained.

The rotary table system disclosed in Patent Document 2 is superior to that of Patent Document 1 in terms of the axial and radial run-out accuracy because of the use of an integrated endless track rail. In this rotary table system, however, special structures are employed for the endless track rail and the guide blocks to enable the guide blocks to be assembled to the endless track rail. That is, rolling element rolling grooves of the endless track rail and those of the guide blocks are not provided at bilaterally symmetric positions in their respective cross-sections, by way of example. Therefore, it is difficult to obtain a high accuracy. Further, because the cross-section of the endless track rail is substantially rectangular, when the endless track rail is to be secured to a fixed bed (base), the surface of the endless track rail needs to be machined to form bolt holes, for example, for securing the rail to the fixed bed. Consequently, when the guide blocks pass the machined portions of the endless track rail, seal members and so forth attached to both ends of each guide block come in sliding contact with the machined portions, causing small torque fluctuations, which makes it impossible to obtain a high-precision rotary table system.

There are other rotary table systems of the type described above, besides those disclosed in the above-mentioned Patent Documents 1 and 2, e.g. cross roller guide type, angular contact bearing type and tapered roller type rotary table systems. None of these conventional rotary table systems, however, can satisfactorily meet all the demands for achieving axial and radial run-out accuracy, high resolution, and thin and medium- or large-sized system. An object of the present invention is to provide a rotary table system capable of satisfactorily meeting all the demands for achieving axial and radial run-out accuracy, high resolution, and thin and medium- or large-sized system.

Means for Solving the Problem:

To solve the above-described problem, the present invention provides a rotary table system characterized by including a guide apparatus and a rotary table mounted on the guide apparatus. The guide apparatus includes a ring-shaped integrated rail having no discontinuity in the travel direction thereof, and a plurality of guide blocks that are assembled to the rail from the direction of their surfaces opposing the rail. The surface of the rail opposite to the surface thereof opposing the guide blocks and the underside of the rotary table are joined together.

In addition, the above-described rotary table system is characterized in that the rail has a substantially L-shaped cross-sectional configuration formed from a vertical portion and a horizontal portion extending from the upper end of the vertical portion in the radial direction of the rotary table.

In addition, the above-described rotary table system is characterized by further including a detecting mechanism that detects an amount of rotation of the rotary table. A tape scale that is to be detected by the detecting mechanism is provided on the outer peripheral surface of the rail.

In addition, the above-described rotary table system is characterized by further including mounting sections having mounting surfaces to which the guide blocks are secured. The mounting sections are equally spaced along the same circumference on a base that is a separate member from the rail and the guide blocks.

In addition, the above-described rotary table system is characterized in that the rail has a plurality of rolling element rolling surfaces formed along the travel direction of the rail. The guide blocks each include a guide block body having load rolling element rolling surfaces that form load rolling element rolling passages in cooperation with the rolling element rolling surfaces. The guide block body further has rolling element relief bores associated with the load rolling element rolling surfaces. Each guide block further includes end plates attached to both ends of the guide block body in the travel direction of the rail. Each end plate has rolling element direction change passages that form rolling element recirculation passages in cooperation with the load rolling element rolling passages and the rolling element relief bores.

BEST MODE FOR CARRYING OUT THE INVENTION

An embodiment of the present invention will be explained below with reference to the accompanying drawings. FIGS. 1 to 4 are diagrams showing the arrangement of a rotary table system according to the present invention, in which:

FIG. 1 is a plan view of the rotary table system;

FIG. 2 is a plan view of the rotary table system with a top table removed therefrom;

FIG. 3A is a sectional view of the rotary table system (as seen from the direction of the arrow X-O-X' in FIG. 2); FIG. 3B is an enlarged view of part A in FIG. 3A; and FIG. 4 is a fragmentary side view showing one half of the rotary table system.

The rotary table system 10 has a ring-shaped (annular) integrated rail 11 with a substantially L-shaped cross-sectional configuration that has no discontinuity in the travel direction thereof. The rotary table system 10 further has guide blocks 12 assembled to the integrated rail 11. The guide blocks 12 are secured to the respective mounting surfaces of a plurality (6 in the figures) of mounting sections 17 equally spaced along the same circumference on the top of a base 13. The guide blocks 12 are assembled to the rail 11 from the direction of their horizontal surfaces opposing the rail 11, as will be detailed later. The underside of a top table (rotary table) 14 is secured to the surface (top) of the rail 11 opposite to the surface thereof opposing the guide blocks 12. A DD motor (direct-drive motor) 15 for applying torque to the top table 14 is disposed between the underside of the top table 14 and the top of the base 13. The DD motor 15 comprises a stator 15-1 having a stator core 15-1a and a rotor 15-2 having a magnet 15-2a provided along the outer periphery thereof. When driving electric power is supplied to the stator core 15-1a, the rotor 15-2 is rotated, causing the top table 14 connected to the rotor 15-2 to rotate.

A detecting mechanism 16 is installed at a predetermined position on the base 13 so that its detecting section (linear encoder) 16a faces the outer peripheral surface of the rail 11. A tape scale 20 to be detected by the linear encoder is attached to the outer peripheral surface of the rail 11 (see FIG. 5). It should be noted that reference numeral 18 denotes a motor cable for supplying driving electric power to the DD motor 15, and reference numeral 19 denotes a magnetic pole sensor cable. The motor cable 18 and the magnetic pole sensor cable 19 are routed through the gap between a pair of guide blocks 12 on the top of the base 13 and therefore will not interfere with the rotational motion of the top table 14 or the movement of the rail 11. In contrast, the rotary table system disclosed in Patent Document 2, for example, is arranged so that the guide blocks move along the endless track rail, and hence needs to machine the base to route the motor cable and so forth so that the motor cable, etc. will not interfere with the movement of the guide blocks.

FIG. 5 is a diagram showing the arrangement of a part of the rotary table system in which a guide block 12 is attached to the rail 11. FIG. 6 is a diagram showing the guide block 12 as seen from the underside thereof. As shown in the figures, the rail 11 has an L-shaped radial section. That is, the L-shaped rail 11 has at the distal end thereof a vertical portion 11a that is inserted into the opening of the guide block 12. A horizontal portion 11b extends from the upper end of the vertical portion 11a in the radial direction of the top table 14. A tape scale 20 to be detected by the above-described linear encoder is secured to the outer peripheral surface of the horizontal portion 11b of the rail 11.

Ridges 21 and 22 are formed in bilateral symmetry on the left and right sides, respectively, of the part of the vertical portion 11a of the rail 11 that is inserted into the opening of the guide block 12. Rolling element rolling surfaces (rolling element rolling grooves in this embodiment) 21-1 and 21-2 are formed on the upper and lower corners of the ridge 21, and rolling element rolling surfaces (rolling element rolling grooves in this embodiment) 22-1 and 22-2 are formed on the upper and lower corners of the ridge 22. It should be noted here that the rolling element rolling surfaces 21-1 and 21-2 and the rolling element rolling surfaces 22-1 and 22-2 are a plurality of rolling element rolling surfaces provided at bilaterally symmetric positions in the cross-section of the rail 11.

The guide block 12 includes a block body 31 having a U-shaped cross-sectional configuration as a main body thereof. The block body 31 has skirt portions 32 and 33 formed on the left and right sides thereof. The skirt portions 32 and 33 face each other across the opening of the U-shaped block body 31. The width L1 of the opening of the block body 31 (i.e. the spacing between the mutually opposing inner surfaces of the skirt portions 32 and 33) is larger than the width L2 between the respective distal ends of the ridges 21 and 22 of the rail 11 (L1>L2). That is, the distal end of the vertical portion 11a of the rail 11 can be fitted into the block body 31 of the guide block 12 from above the opening thereof (i.e. the surface of the block body 31 that opposes the rail 11).

The inner surface of the skirt portion 32 of the guide block 12 is provided with load rolling element rolling surfaces (rolling grooves in this embodiment) 32-1 and 32-2 extending in the rail travel direction so as to face the rolling element rolling surfaces 21-1 and 21-2 of the rail 11. The inner surface of the skirt portion 33 is provided with load rolling element rolling surfaces (rolling grooves in this embodiment) 33-1 and 33-2 extending in the rail travel direction so as to face the rolling element rolling surfaces 22-1 and 22-2 of the rail 11. It should be noted here that the load rolling element rolling surfaces 32-1 and 32-2 and the load rolling element rolling surfaces 33-1 and 33-2 are a plurality of load rolling element rolling surfaces provided at bilaterally symmetric positions in a section of the guide block 12 that is perpendicular to the rail travel direction. In addition, the skirt portion 32 is provided with rolling element relief bores 32-3 and 32-4 respectively associated with the load rolling element rolling surfaces 32-1 and 32-2. The skirt portion 33 is provided with rolling element relief bores 33-3 and 33-4 respectively associated with the load rolling element rolling surfaces 33-1 and 33-2.

The rolling element rolling surfaces 21-1 and 21-2 of the rail 11 and the load rolling element rolling surfaces 32-1 and 32-2 of the guide block body 31 form load rolling element rolling passages R1 and R2, respectively. The rolling element rolling surfaces 22-1 and 22-2 of the rail 11 and the load rolling element rolling surfaces 33-1 and 33-2 of the guide block body 31 form load rolling element rolling passages R3 and R4, respectively. End plates 34 and 35 are provided at both ends of the guide block body 31 in the travel direction (axial direction) of the rail 11. The end plates 34 and 35 are each provided with direction change passages R5 and R6 for moving rolling elements (balls B) in the load rolling element rolling passages R1 and R2 into the rolling element relief bores 33-3 and 33-4 or moving them in the opposite direction, and further provided with direction change passages R7 and R8 for moving rolling elements (balls B) in the load rolling element rolling passages R3 and R4 into the rolling element relief bores 32-3 and 32-4 or moving them in the opposite direction.

That is, as the rail 11 moves, a multiplicity of rolling elements (balls B) roll and recirculate through rolling element recirculation passages (there are four rolling element recirculation passages in the illustrated example) respectively formed from the load rolling element rolling passages R1, R2, R3 and R4, the rolling element relief bores 32-3, 32-4, 33-3 and 33-4 and the direction change passages R5, R6, R7 and R8. Although the balls B are used as the rolling elements in the above-described example, it should be noted that rollers may be used as the rolling elements.

As stated above, the width L1 of the opening of the guide block body 31 is larger than the width L2 between the distal ends of the ridges 21 and 22 of the rail 11 (L1>L2), and hence the endless integrated ring-shaped rail 11 can be fitted into the guide block body 31 from above the opening thereof. In addition, the end plates 34 and 35 are each made splittable into a pair of split parts so as to be capable of being assembled to the rail 11 from both sides thereof.

FIGS. 7A, 7B and 7C show a structural example of the end plate 34. FIG. 7A is an exploded plan view. FIG. 7B is an exploded front view. FIG. 7C is a side view. As shown in these figures, the end plate 34 has a substantially U-shaped configuration in a front view. The end plate 34 is formed from a pair of split parts 34-1 and 34-2 that are splittable to left and right in the width direction at the opening of the end plate 34. One split part 34-1 of the end plate 34 has a positioning pin 36 projecting from a parting surface a thereof. A positioning hole 37 fittable with the positioning pin 36 is provided in a parting surface b of the other split part 34-2. Further, securing screw holes 38-1 and 38-2 are provided in the split parts 34-1 and 34-2, respectively. The two split parts 34-1 and 34-2 are brought toward each other from both sides of the rail 11 so that the parting surfaces a and b approach each other. Then, the positioning pin 36 is fitted into the positioning hole 37, and the parting surfaces a and b are brought into coincidence with each other, thereby forming an end plate assembly. Next, the end plate assembly is secured to one end of the block body 31 by using securing pins passed through the securing screw holes 38-1 and 38-2 of the split parts 34-1 and 34-2. It should be noted that reference numeral 39 denotes an oil hole.

As stated above, the split parts 34-1 and 34-2, which constitute the end plate 34, are brought toward each other from both sides of the rail 11. Then, the positioning pin 36 is fitted into the positioning hole 37, and the parting surfaces a and b are brought into coincidence with each other to form an end plate assembly. Accordingly, the split parts 34-1 and 34-2 can be positioned with respect to each other with high accuracy. Further, the end plate assembly is secured to one end of the guide block body 31 by using securing screws passed through the securing screw holes 38-1 and 38-2. Thus, the split parts 34-1 and 34-2 can be positioned and secured with high accuracy, and no displacement will occur during use. The end plate 35 is also arranged in the same way as the end plate 34, so that it can be secured to another end of the block body 31 by bringing a pair of split parts toward each other from both sides of the rail 11. The arrangement of the end plates 34 and 35 is not necessarily limited to the above. For example, each end plate may be arranged so that it can be assembled by bringing a pair of split parts toward each other from both sides of the rail 11. Each end plate may be formed from a material having elasticity so that it can be fitted onto the rail 11 from the lower side thereof by expanding the width of the opening of the end plate using the elasticity.

In the rotary table system arranged as stated above, when the top table 14 is rotated by the DD motor 15, the rail 11 moves together with the top table 14, being guided by a plurality (6 in this embodiment) of guide blocks 12. The movement of the rail 11 is detected by the detecting section 16a of the detecting mechanism 16. For the detection of the movement of the rail 11, a tape scale 20 is attached to the outer peripheral surface of the horizontal portion 11b, which is the largest outer diameter portion of the L-shaped rail 11, and the scale 20 is detected by a linear encoder, which constitutes the detecting section 16a, as has been stated above. By employing such an arrangement, the amount of rotation of the top table 14 can be detected with a higher resolution than by a method in which the rotational position of the rotor 15-2 of the DD motor 15, shown in FIG. 3C, is detected with a magnetic sensor, for example. Accordingly, it becomes possible to finely control the rotation of the top table 14.

To secure a guide block 12 to the mounting surface (top) of a mounting section 17 of the base 13, as shown in FIG. 3B, flanges 12a on both sides of the guide block 12 are provided with holes for passing screws 23, and the guide block 12 is secured to the mounting surface with the screws 13 passed through the holes. Thus, the guide blocks 12 are secured to the accurately machined mounting surfaces of the mounting sections 17. Therefore, it is possible to realize a high-precision rotary table system. In addition, because the rail 11 is guided by a plurality of guide blocks 12 arranged as stated above, even if a preload is applied to the rolling elements interposed between the rolling element rolling surfaces of the rail 11 and the rolling element rolling surfaces of the guide block body 31 to prevent backlash, it is possible to realize a rotary table system capable of rotating the top table 14 with lower torque than in an arrangement wherein a large number of rolling elements are disposed on the entire circumference of the rail 11, and the rolling elements are preloaded, for example.

Further, the rolling element rolling surfaces 21-1 and 21-2 and the rolling element rolling surfaces 22-1 and 22-2 formed on the rail 11 are a plurality of rolling element rolling surfaces provided at bilaterally symmetric positions in the cross-section of the rail 11, and the load rolling element rolling surfaces 32-1 and 32-2 and the load rolling element rolling surfaces 33-1 and 33-2 formed on the guide block 12 are a plurality of load rolling element rolling surfaces provided at bilaterally symmetric positions in a section of the guide block 12 that is perpendicular to the rail travel direction. Therefore, the left and right (inner and outer peripheral) sides of the rail can be supported with good balance in comparison to an arrangement in which rolling element rolling surfaces and load rolling element rolling surfaces are provided in bilateral asymmetry on the rail and the guide block, as in the rotary table system disclosed in Patent Document 2, for example. Accordingly, it is possible to minimize radial and axial vibrations of the top table 14.

The integrated rail 11 has the vertical portion 11a and the horizontal portion 11b in a substantially L-shaped cross-sectional configuration, as has been stated above. Therefore, when the underside of the top table 14 and the top of the rail 11 are to be joined to each other, screw holes are provided in the horizontal portion 11b from the underside thereof so as to extend into the top table 14, and screws 25 are threaded into the screw holes, whereby the rail 11 can be joined to the top table 14. Accordingly, the vertical portion 11a of the rail 11, which slides along the guide blocks 12, need not be subjected to machining for mounting the top table 14. Thus, the surface of the rail 11 that slides along the guide blocks 12 remains being a smooth surface having the same high accuracy as that obtained upon completion of the rail machining process. Therefore, seal members provided at both ends of each guide block 12 contact the sliding surface of the rail 11 with a constant frictional force at all times, so that there will be no torque fluctuation or the like. Thus, a high-precision rotary table system can be realized. In addition, because the rail 11 is formed into a substantially L-shaped cross-sectional configuration, the moment of inertia of area of the rail 11 increases. Accordingly, even if the rail 11 is ground with high accuracy and thereafter subjected to treatment such as quenching, the high accuracy can be maintained. There will be a minimal change in coaxiality of the rail 11, and rail aging distortion or the like will be very small. In this respect also, it is possible to realize a high-precision rotary table system having minimal axial and radial run-outs.

In addition, the whole circumference of the top table 14 is supported by the horizontal portion 11b of the integrated rail 11, and the movement of the rail 11 is guided by a plurality of guide blocks 12 equally spaced along the same circumference on the top of the base 13. With this arrangement, unlike a ring-shaped rail formed from a plurality of split members, the rail 11 has no joint, and hence there is no rattling due to joints. In this respect also, axial and radial run-outs are reduced, and the accuracy increases to a considerable extent. Although in the foregoing embodiment the rail 11 is arranged in a substantially L-shaped cross-sectional configuration formed from a vertical portion and a horizontal portion, it should be noted that the rail is not necessarily limited to the above-described configuration but may be formed in a substantially rectangular cross-sectional configuration. In such a case, the surface of the rail 11 that slides along the guide blocks 12 is subjected to machining for mounting the top table. Therefore, there will be torque fluctuations when the seal members, etc. provided at both ends of each guide block 12 pass the machined portions of the rail 11, and the accuracy will be reduced correspondingly to the torque fluctuations.

The rotary table system arranged as stated above is superior to conventional rotary table systems, e.g. cross roller guide type, angular contact bearing type and tapered roller type rotary table systems, from all the viewpoints of achieving high axial and radial run-out accuracy, high resolution, thickness reduction, and upsizing.

It is possible to realize the following high-precision rotary table system, for example, by employing the above-described arrangement and using a linear encoder as the detecting section 16a of the detecting mechanism 16 and a tape scale attached to the outer peripheral surface of the rail 11 as a member to be detected by the linear encoder.

Size of top table 14: 650 φ
Limit stroke: 300°
Absolute positioning accuracy: ±10 seconds (expected value: ±5 to 2 seconds)
Repeatability positioning accuracy: ±1 second (expected value: not more than 1 second)
Radial run-out (excluding flatness): 5 im (expected value: not more than 3 im)
Rated torque (motor alone): 67 Nm
Maximum torque (motor alone): 134 Nm
Rated number of revolutions: 15 rpm
Rated output: 800 W
Rated current: 6.3 A
Detecting resolution: 0.5 second
Power supply used: 3-phase 200 V As an index of torque, the rotary table system can move an iron column (100 kg) of φ650×38 in the following patterns:
Travel distance=180°
Cycle time=6 seconds
Acceleration/deceleration time=1 second
Travel time=3 seconds Although one embodiment of the present invention has been described above, the present invention is not necessarily limited to the foregoing embodiment but can be modified in a variety of ways without departing from the appended claims and the scope of the technical idea described in the specification and the accompanying drawings.

INDUSTRIAL APPLICABILITY

As has been stated above, the present invention provides a guide apparatus including a ring-shaped integrated rail having no discontinuity in the travel direction thereof. The guide apparatus further includes a plurality of guide blocks that are assembled to the rail from the direction of their surfaces opposing the rail. The surface of the rail opposite to the surface thereof opposing the guide blocks is joined to the underside of a rotary table, thereby allowing the rail to rotate together with the rotary table. With this arrangement, the rail has no joint and has a high degree of coaxiality in comparison, for example, to a split rail that is formed from split members. Therefore, the rotary table system is excellent in axial and radial run-out accuracy. In addition, because the rail is joined to the rotary table, the whole circumference of the rotary table is supported by the rail having a substantially L-shaped cross-sectional configuration, unlike the arrangement in which the rotary table is supported by a plurality of guide blocks, as disclosed in Patent Document 2. Accordingly, the rigidity of the rotary table increases, and in this respect also, the accuracy increases.

In addition, the rail has a substantially L-shaped cross-sectional configuration formed from a vertical portion and a horizontal portion extending from the upper end of the vertical portion in the radial direction of the rotary table. Thus, when the rail and the rotary table are to be joined together, the horizontal portion of the rail can be joined to the rotary table, and the surface of the vertical portion of the rail that slides along the guide blocks need not be machined to form mounting holes for mounting bolts, for example. Accordingly, the rail surface that slides along the guide blocks is kept smooth (i.e. the rail surface remains as smooth as it was when the endless track rail was produced with high accuracy). Consequently, there is no torque fluctuation which would otherwise occur when the seal members, etc. provided at both ends of each guide block pass the machined mounting portions of the rail. Hence, a high-precision rotary table system can be realized. In addition, because the rail is formed into a substantially L-shaped cross-sectional configuration, the moment of inertia of area and cross-sectional area of the rail increase. Accordingly, even if the rail is ground with high accuracy and thereafter subjected to treatment such as quenching, the high accuracy can be maintained. Rail aging distortion is also small. Thus, it is possible to realize a high-precision rotary table system having minimal axial and radial run-outs.

In addition, because a tape scale that is to be detected by the detecting mechanism is provided on the outer peripheral surface of the rail, the rotation (rotational position) of the rotary table can be detected with a high resolution, and it is possible to realize a rotary table system capable of fine rotation control.

In addition, because the mounting sections are equally spaced along the same circumference on a base that is a separate member from the rail and the guide blocks, the accuracy increases owing to the equalizing effect, and an extra-thin rotary table system can be realized.

In addition, the guide blocks each include a guide block body having load rolling element rolling surfaces that form load rolling element rolling passages in cooperation with a plurality of rolling element rolling surfaces formed on the rail. The guide block body further has rolling element relief bores associated with the load rolling element rolling surfaces. Each guide block further includes end plates provided at both ends of the guide block body in the travel direction of the rail. Each end plate has rolling element direction change passages that form rolling element recirculation passages in cooperation with the load rolling element rolling passages and the rolling element relief bores. Accordingly, it is possible to provide a rotary table system having minimal axial and radial run-outs and capable of rotating with extremely low torque by making use of the characteristics of the guide blocks.

BRIEF DESCRIPTION OF THE DRAWINGS

FIGS. 3A and 3B are sectional views of the rotary table system according to the present invention (as seen from the direction of the arrow X-O-X' in FIG. 2).

EXPLANATION OF REFERENCE NUMERALS

Figure 1:
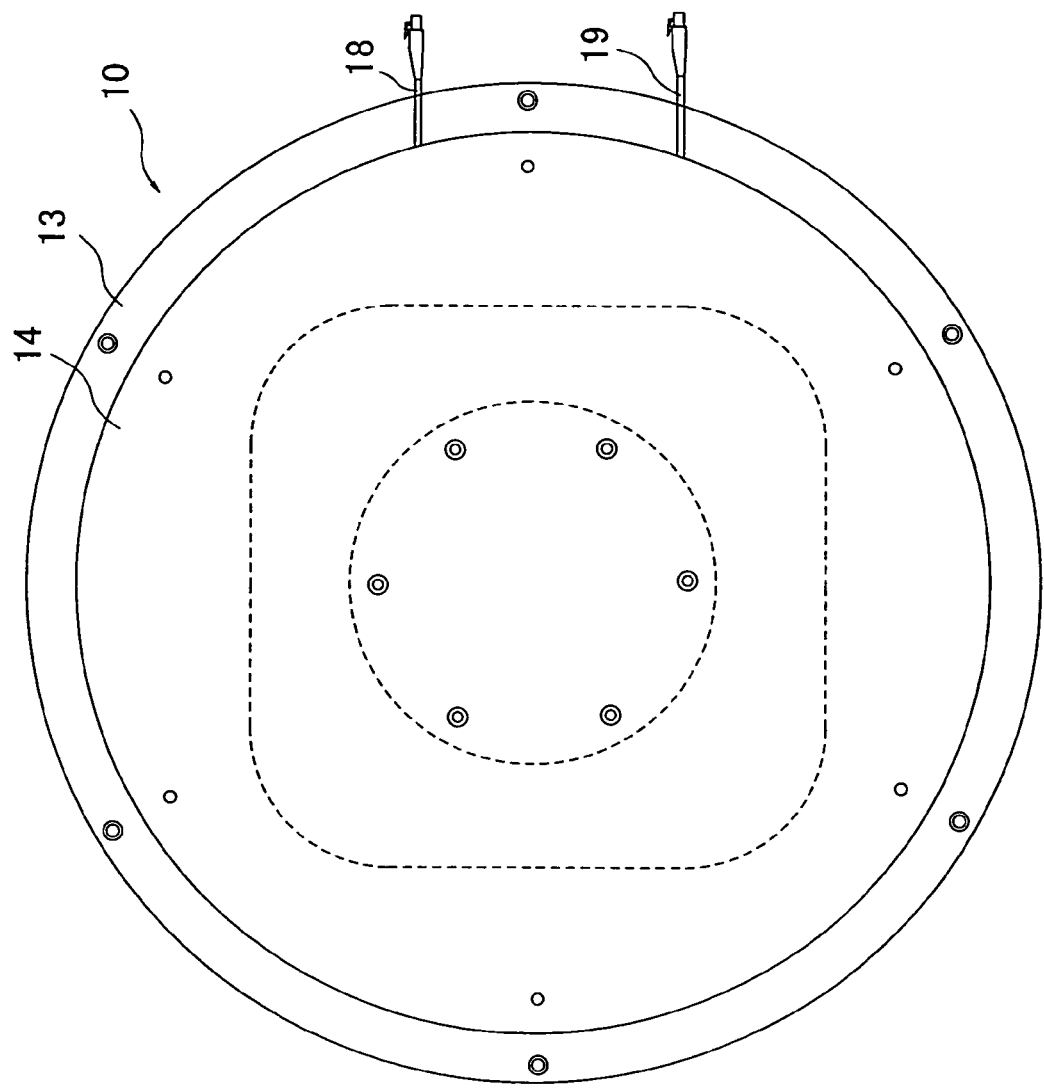
FIG. 1 is a plan view showing the arrangement of a rotary table system according to the present invention.
Figure 2:
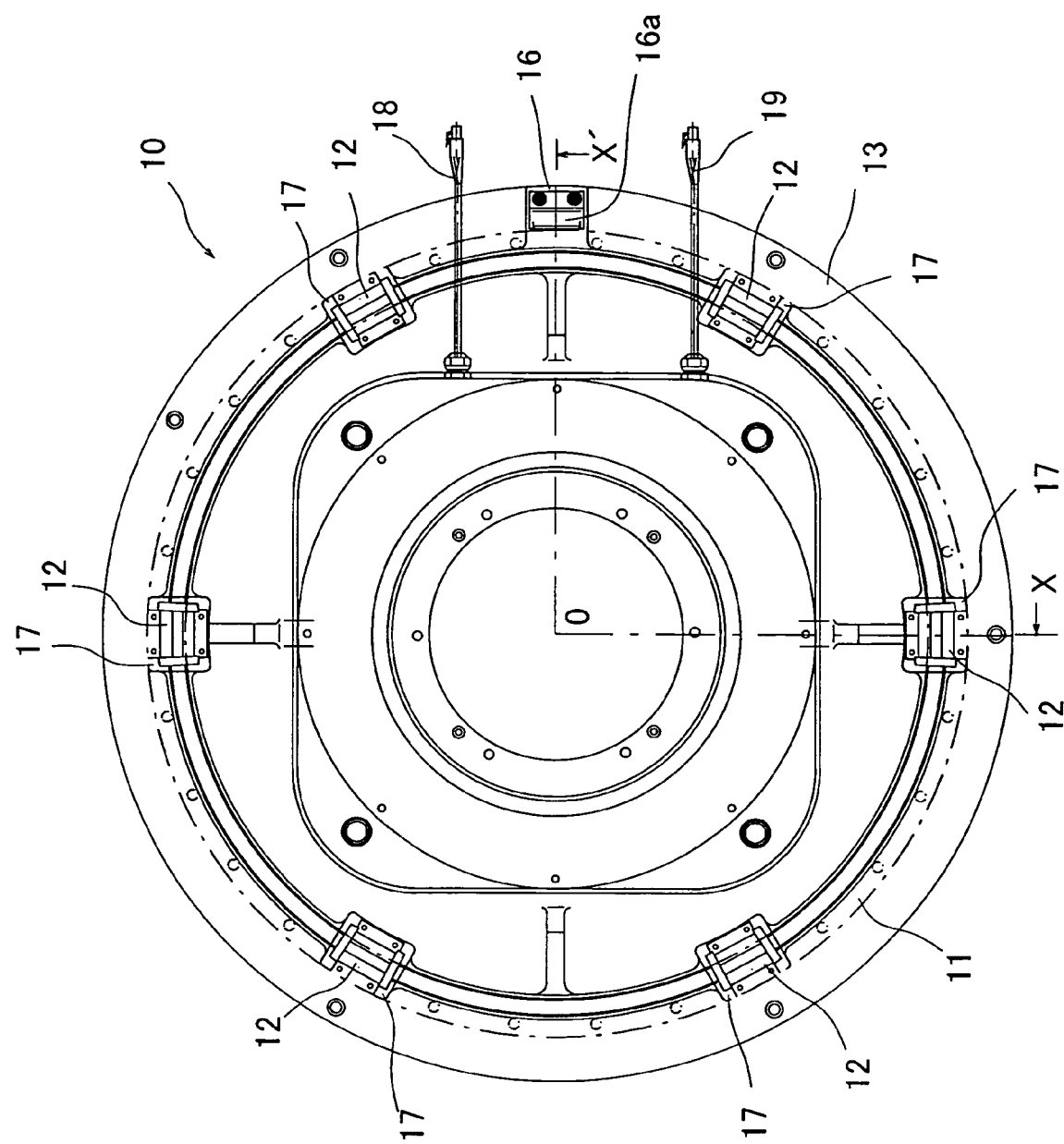
FIG. 2 is a plan view of the rotary table system according to the present invention with a top table removed therefrom.
Figure 4:
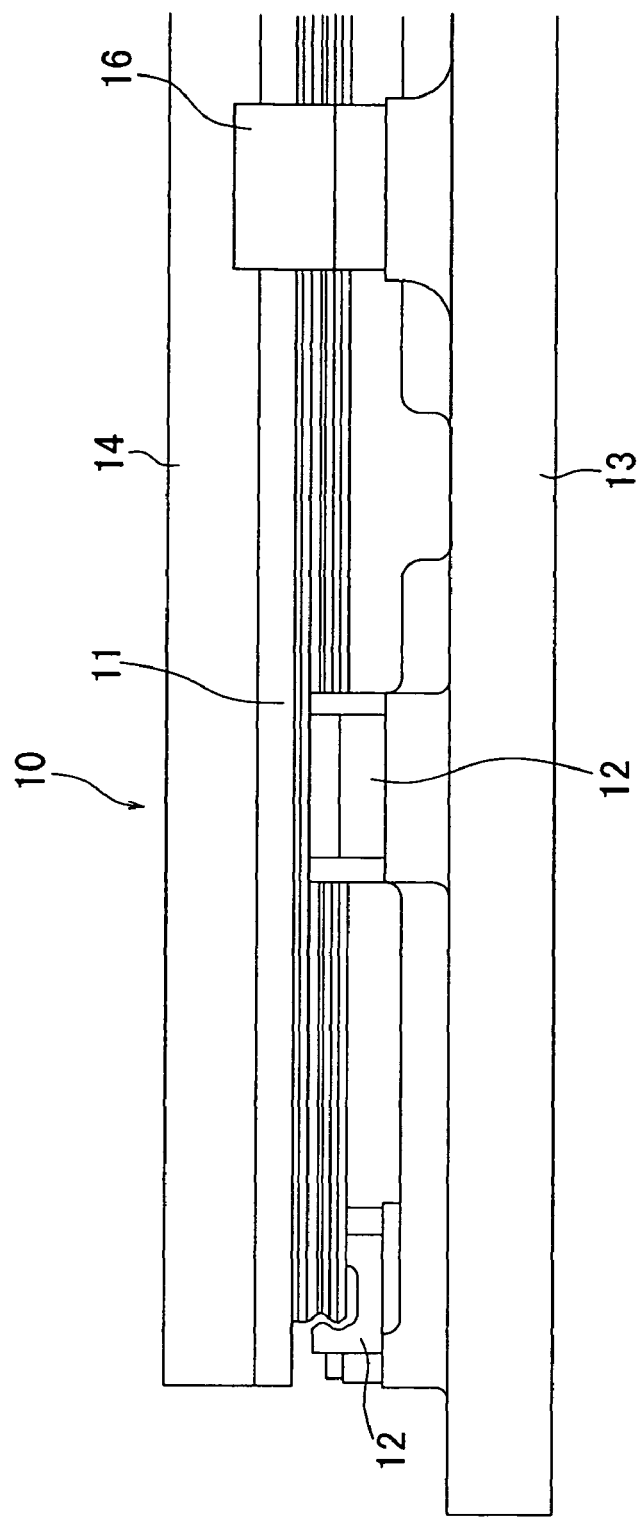
FIG. 4 is a fragmentary side view showing one half of the rotary table system according to the present invention.
Figure 5:
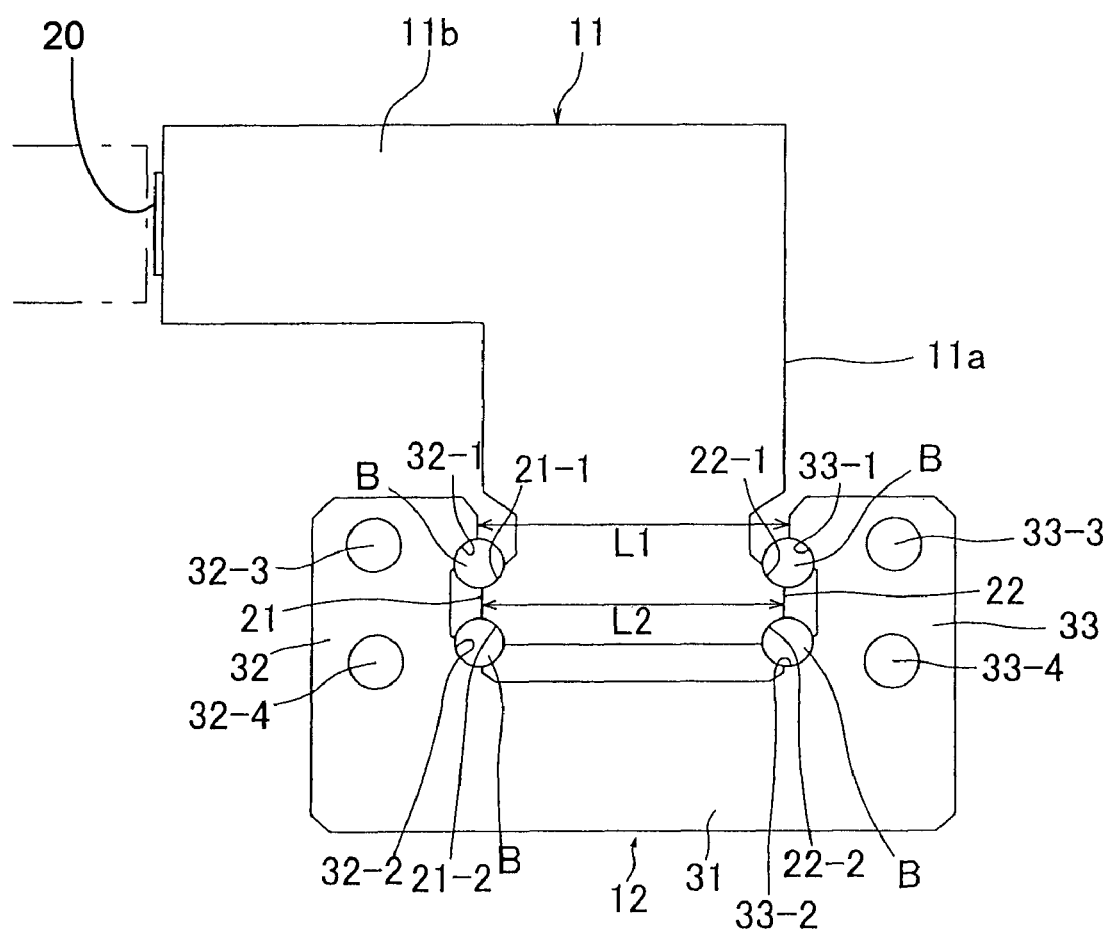
FIG. 5 is a sectional view showing a guide block assembled to a rail of the rotary table system according to the present invention.
Figure 6:
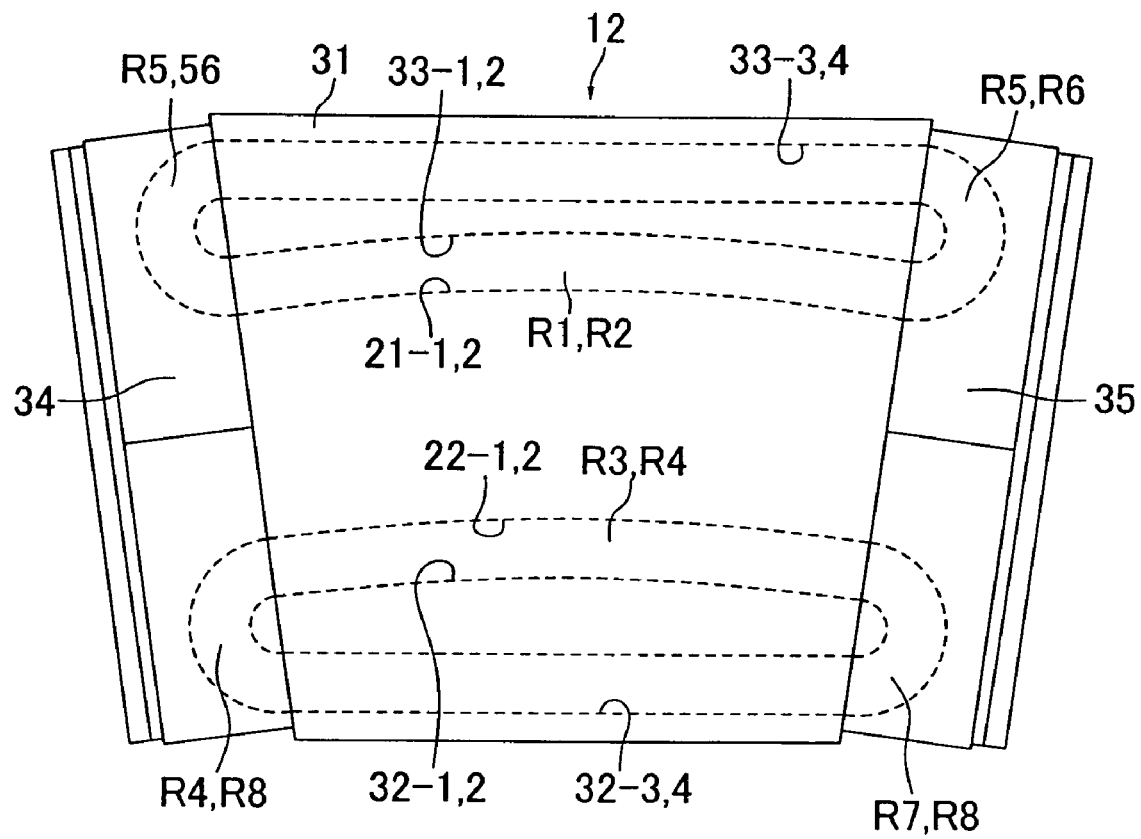
FIG. 6 is a diagram showing the guide block as seen from the underside thereof.
Figure 7A:
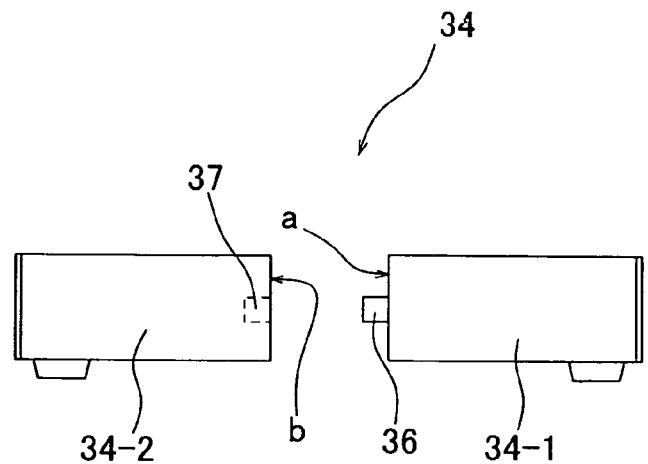
FIGS. 7A, 7B and 7C are diagrams showing a structural example of an end plate of a guide block.
Figure 7B:
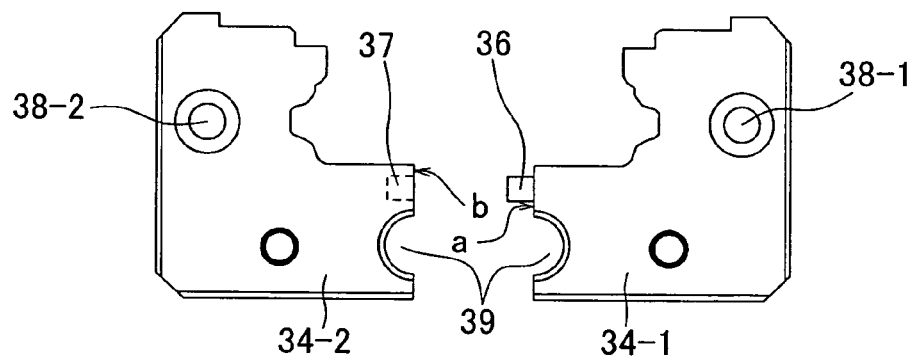
Figure 7C:
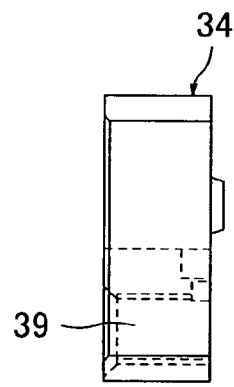

10: rotary table system
11: rail
12: guide block
13: base
14: top table
15: DD motor
16: detecting mechanism
17: mounting section
18: motor cable
19: magnetic sensor cable
20: tape scale
21: ridge
21-1: rolling element rolling surface
21-2: rolling element rolling surface
22: ridge
22-1: rolling element rolling surface
22-2: rolling element rolling surface
23: screw
31: block body
32: skirt portion
32-1: load rolling element rolling surface
32-2: load rolling element rolling surface
33: skirt portion
33-1: load rolling element rolling surface
33-2: load rolling element rolling surface
34: end plate
34-1: split part
34-2: split part
35: end plate
36: positioning pin
37: positioning hole
38-1: securing screw hole
38-2: securing screw hole
39: oil hole

What is claimed is:

1. A rotary table system comprising:
a guide apparatus; and
a rotary table mounted on said guide apparatus;
said guide apparatus including a ring-shaped integrated rail having no discontinuity in a travel direction thereof, and a plurality of guide blocks that are assembled to said rail from a direction of their surfaces opposing said rail;
wherein each of said plurality of guide blocks includes a U-shaped cross-sectional opening and a portion of said rail is fitted into the U-shaped cross-sectional opening from above the opening, and
wherein a top surface of said rail opposite to the portion of said rail fitted into the U-shaped cross-sectional opening and an underside of said rotary table are joined together.

2. A rotary table system according to claim 1, wherein said rail has a substantially L-shaped cross-sectional configuration formed from a vertical portion and a horizontal portion extending from an upper end of said vertical portion in a radial direction of said rotary table.

3. A rotary table system according to claim 2, further comprising:
a tape scale provided on an outer peripheral surface of said rail; and
a detecting mechanism that faces the outer peripheral surface of said rail and detects an amount of rotation of said rotary table by detecting said tape scale.

4. A rotary table system according to claim 2, further comprising:
mounting sections having mounting surfaces to which said guide blocks are secured, said mounting sections being equally spaced along a same circumference on a base that is a separate member from said rail and guide blocks.

5. A rotary table system according to claim 2, wherein said rail has a plurality of rolling element rolling surfaces formed along the travel direction of said rail;
said guide blocks each including:
a guide block body having load rolling element rolling surfaces, said load rolling element rolling surfaces of said guide block face said rolling element rolling surfaces of said rail to form load rolling element rolling passages, said guide block body further having rolling element relief bores; and
end plates provided at both ends of said guide block body in the travel direction of said rail, said end plates each having rolling element direction change passages,
wherein said rolling element direction change passages, said load rolling element rolling passages and said rolling element relief bores form rolling element recirculation passages in which a plurality of rolling elements roll and recirculate as the rail moves.

6. A rotary table system according to claim 1, further comprising:
a tape scale provided on an outer peripheral surface of said rail; and
a detecting mechanism that faces the outer peripheral surface of said rail and detects an amount of rotation of said rotary table by detecting said tape scale.

7. A rotary table system according to claim 6, further comprising:
mounting sections having mounting surfaces to which said guide blocks are secured, said mounting sections being equally spaced along a same circumference on a base that is a separate member from said rail and guide blocks.

8. A rotary table system according to claim 6, wherein said rail has a plurality of rolling element rolling surfaces formed along the travel direction of said rail;
said guide blocks each including:
a guide block body having load rolling element rolling surfaces, said load rolling element rolling surfaces of said guide block face said rolling element rolling surfaces of said rail to form load rolling element rolling passages, said guide block body further having rolling element relief bores; and end plates provided at both ends of said guide block body in the travel direction of said rail, said end plates each having rolling element direction change passages, wherein said rolling element direction change passages, said load rolling element rolling passages and said rolling element relief bores form rolling element recirculation passages in which a plurality of rolling elements roll and recirculate as the rail moves.

9. A rotary table system according to claim 1, further comprising:

mounting sections having mounting surfaces to which said guide blocks are secured, said mounting sections being equally spaced along a same circumference on a base that is a separate member from said rail and guide blocks.

10. A rotary table system according to claim 9, wherein said rail has a plurality of rolling element rolling surfaces formed along the travel direction of said rail;

said guide blocks each including:

a guide block body having load rolling element rolling surfaces, said load rolling element rolling surfaces of said guide block face said rolling element rolling surfaces of said rail to form load rolling element rolling passages, said guide block body further having rolling element relief bores; and end plates provided at both ends of said guide block body in the travel direction of said rail, said end plates each having rolling element direction change passages, wherein said rolling element direction change passages, said load rolling element rolling passages and said rolling element relief bores form rolling element recirculation passages in which a plurality of rolling elements roll and recirculate as the rail moves.

11. A rotary table system according to claim 1, wherein said rail has a plurality of rolling element rolling surfaces formed along the travel direction of said rail; and said guide blocks each including:

a guide block body having load rolling element rolling surfaces, said load rolling element rolling surfaces of said guide block face said rolling element rolling surfaces of said rail to form load rolling element rolling passages, said guide block body further having rolling element relief bores; and end plates provided at both ends of said guide block body in the travel direction of said rail, said end plates each having rolling element direction change passages, wherein said rolling element direction change passages, said load rolling element rolling passages and said rolling element relief bores form rolling element recirculation passages in which a plurality of rolling elements roll and recirculate as the rail moves.

* * * * *